(12) United States Patent
Reichow et al.

(10) Patent No.: US 10,917,683 B2
(45) Date of Patent: Feb. 9, 2021

(54) MULTIMEDIA SYSTEM FOR TRANSFORMING ANY ROOM INTO A SHOW ENVIRONMENT

(71) Applicant: DISNEY ENTERPRISES, INC., Burbank, CA (US)

(72) Inventors: Mark A. Reichow, Glendale, CA (US); Jeffrey L. Voris, Los Angeles, CA (US); John David Smith, Burbank, CA (US); Zachery W. Kennedy, Los Angeles, CA (US); Preston Timothy Landry, Three Rivers, CA (US)

(73) Assignee: Disney Enterprises, Inc., Burbank, CA (US)

( * ) Notice: Subject to any disclaimer, the term of this patent is extended or adjusted under 35 U.S.C. 154(b) by 512 days.

(21) Appl. No.: 15/291,235

(22) Filed: Oct. 12, 2016

(65) Prior Publication Data

US 2018/0103287 A1    Apr. 12, 2018

(51) Int. Cl.
| | | |
|---|---|---|
| *H04N 21/43* | (2011.01) | |
| *H04N 9/31* | (2006.01) | |
| *H04N 21/41* | (2011.01) | |
| *H04N 7/00* | (2011.01) | |

(Continued)

(52) U.S. Cl.
CPC ......... *H04N 21/4307* (2013.01); *H04N 7/002* (2013.01); *H04N 9/3141* (2013.01); *H04N 9/3147* (2013.01); *H04N 9/3179* (2013.01); *H04N 9/3185* (2013.01); *H04N 21/2143* (2013.01); *H04N 21/4122* (2013.01); *H04N 21/4131* (2013.01); *H05B 47/155* (2020.01)

(58) Field of Classification Search
CPC .......... H04N 21/4307; H04N 21/4131; H04N 21/4122

See application file for complete search history.

(56) References Cited

U.S. PATENT DOCUMENTS

| | | |
|---|---|---|
| 3,689,139 A | 9/1972 | Gross et al. |
| 4,184,755 A | 1/1980 | Burgess et al. |
| 7,550,935 B2 | 6/2009 | Lys et al. |

(Continued)

FOREIGN PATENT DOCUMENTS

| | | |
|---|---|---|
| CN | 102012623 | 4/2011 |
| JP | 2005099588 | 4/2005 |

(Continued)

*Primary Examiner* — Yassin Alata
(74) *Attorney, Agent, or Firm* — Snell & Wilmer L.L.P.; Kent A. Lembke (57) ABSTRACT

A show system or in-room entertainment or show system configured to provide engaging and immersive multimedia shows or presentations in nearly any space (or "room") that is defined by one or more walls. The in-room show system generally includes a controller for selectively operating a display device (e.g., a television or the like), a video projector, an audio system (e.g., one or more speakers), and other show components (e.g., one or more lights, a fan, a mechanical device, and so on). Media content is predefined for the room, and the controller operates (such as in response to a triggering switch or remote control device that may take the form of a show prop activated by someone in the room) to serve the media content to tell a story and/or magically transform the space into a multidimensional and immersive entertainment space.

10 Claims, 8 Drawing Sheets

(51) Int. Cl.
 *H04N 21/214* (2011.01)
 *H05B 47/155* (2020.01)

(56) References Cited

U.S. PATENT DOCUMENTS

| | | | |
|---|---|---|---|
| 7,871,192 | B2 | 1/2011 | Chien |
| 8,879,782 | B2 | 11/2014 | Garlington et al. |
| 2003/0227765 | A1 | 12/2003 | Kubo |
| 2005/0128751 | A1 | 6/2005 | Roberge et al. |
| 2006/0221593 | A1 | 10/2006 | Alden |
| 2007/0126864 | A1* | 6/2007 | Bhat ............... H04N 5/144 |
| | | | 348/51 |
| 2007/0211475 | A1 | 9/2007 | Sevack et al. |
| 2008/0042969 | A1 | 2/2008 | Baker |
| 2008/0136973 | A1 | 6/2008 | Park |
| 2009/0015799 | A1 | 1/2009 | Luciano |
| 2009/0073694 | A1 | 3/2009 | Scannell, Jr. |
| 2009/0141370 | A1 | 6/2009 | Takaura et al. |
| 2009/0190044 | A1 | 7/2009 | Chu et al. |
| 2010/0044467 | A1 | 2/2010 | McGuire |
| 2010/0074284 | A1 | 3/2010 | Aizawa et al. |
| 2010/0226617 | A1 | 9/2010 | Piccionelli |
| 2012/0044467 | A1 | 2/2012 | Nakayama et al. |
| 2012/0058725 | A1 | 3/2012 | Pan |
| 2012/0106151 | A1 | 5/2012 | Vissenberg et al. |
| 2012/0188451 | A1 | 7/2012 | Schmidt et al. |
| 2013/0083298 | A1 | 4/2013 | Yoshimura et al. |
| 2014/0043516 | A1 | 2/2014 | Baker |
| 2014/0051510 | A1* | 2/2014 | Benko ............... A63F 13/00 |
| | | | 463/31 |

FOREIGN PATENT DOCUMENTS

| | | |
|---|---|---|
| JP | 2006227143 | 8/2006 |
| WO | 2011117691 | 9/2011 |

\* cited by examiner

MULTIMEDIA SYSTEM FOR TRANSFORMING ANY ROOM INTO A SHOW ENVIRONMENT

BACKGROUND

1. Field of the Description

The present description relates, in general, to entertainment and show systems and, more particularly, to a show system (e.g., an in-room multimedia entertainment or show system) for transforming any space (or any room) into a location for a multimedia show presentation and experience.

2. Relevant Background

There are many settings where it is desirable to provide in-room entertainment to make people's stay in that room or space more enjoyable. These spaces may range from waiting areas (e.g., airport and other transportation staging areas, health and other service waiting rooms, and so on) to hotel rooms to a room in someone's home, and each of these spaces may be considered a "room" in this description. To date, the types of entertainment provided in these spaces or "in-room" has been quite limited.

For example, hotel rooms have long been rather generic environments distinguished from each other mainly by their furnishings, decor, the hotel's location, and out-of-room amenities provided in the hotel or its grounds. Conventional thinking in the hotel industry has been that it is desirable to make their guest very comfortable while they sleep but to otherwise encourage their guests to leave their room to partake in entertaining activities such as shopping and dining on-site or elsewhere in a resort or nearby city.

The idea of in-room entertainment generally has been to provide room service for dining and providing a television (and, in some cases, a media content player and game system) to entertain the guests. Specifically, in-room entertainment provided in hotel rooms has typically been limited to providing pay-per-view movies, television programming, and video games on a television in the hotel room. Nearly all in-room entertainment advances have been directed at making the television the single portal that the guest uses for their pleasure and business life.

SUMMARY

Briefly, the inventors discovered that the possibility of offering more complex and interesting in-room entertainment experiences had not previously been explored. With this in mind, the inventors created a show system (or in-room entertainment or show system) that is configured to provide engaging and immersive multimedia shows or presentations in nearly any space (or "room") that is defined by one or more walls.

The in-room show system generally includes a controller for selectively operating a display device (e.g., a television or the like), a video projector, an audio system (e.g., one or more speakers), and other show components (e.g., one or more lights (which may include black lights), a fan, a mechanical device (e.g., mechanical props), electrical devices (e.g., illusionary props), and so on). Media content is predefined for the room or is provided in real time to suit the room, and the controller operates (such as in response to a triggering switch or remote control device that may take the form of a show prop activated by someone in the room) to serve the media content to tell a story and/or magically transform the space into a multidimensional and immersive entertainment space.

The operations of the in-room show system may, for example, involve the triggering device or remote control being operated to activate a particular show (or set of content). In response, the controller may operate the display device (or television) to display a first set of visual content (e.g., a still or video image) while the audio system is operated to provide a paired set of audio content. The controller may next act to cause the projector to project a second set of visual content (light from the projector projects still or video images) onto surfaces of the room next to or adjacent to the display device such that these images appear to originate from and be expanding outward from the display device. The audio content played by the audio system may be chosen to suit the new projected content as well as that provided by the display device.

At this point in operations, the display device and projector may both be providing video (or still) imagery that is synchronized and/or matched to tell a single story or set a single scene. The controller may next (or concurrently) operate the other show components to make the show presentation more rich and exciting such as by turning lights on or off, by changing the brightness of lights, by changing light colors, by turning a fan on or off or to a higher or lower setting to provide a wind effect, by activating a mechanical or electrical device in the room (e.g., a mechanical toy may start operating, a picture frame with lights may be turned), and so on. The activation of any of these show components may by synchronized with the projected or displayed content, e.g., to have a streak of light be projected, from an object or character displayed by the display device, by the projector to "strike" a lamp that is then illuminated (turned on) by the controller (e.g., a projected stream of stars from a wand could pass over a location of a lamp in the room causing it to be ignited or turned on at a particular color and brightness). In this way, the different types of media and show system components may appear to interact to provide the new in-room entertainment experience.

More particularly, an in-room show system is described for providing entertainment with multimedia content matched to a particular space (e.g., a room). The system includes a display device (e.g., a television or the like) positioned in a room and a projector (e.g., a video projector such as a microprojector) positioned in the room for projecting on one or more surfaces in the room. The system also includes an audio system for providing audio output into the room. Further, a show controller is included in the system for operating the system based on a show file defining display content, projector content, and audio content for a show (e.g., a multimedia show designed specifically for the room). For example, the controller controls the display device to display the display content, the projector to project the projector content onto the one or more surfaces in the room, and the audio system to output the audio content for the show into the room.

In some implementations, the display content, the projector content, and the audio content are time synchronized to each other based on a timeline for the show. Further, the projector content is mapped to the one or more surfaces in the room using projection mapping (e.g., video from the projector appears to match and/or originate the content displayed on the display device). In some cases, the display device is a television (e.g., a conventional flatscreen television) mounted on a wall of the room. The projector content may include video content matching the display content displayed on the television, and the display device and the projector are concurrently operated for at least a portion of the show. The projection mapping may include the television and the video content includes a blacked out area coinciding with an area of the wall where the television is mounted, whereby light output from the projector is projected on surfaces of the wall excluding the television.

To further enhance the show presentation in the room, the audio system includes speakers spaced around the room to provide surround sound, and the audio content includes a soundtrack matching both the display content and the projector content. To further the multimedia aspect of the experience, the show system may include a lighting system with lighting elements that are independently operable to turn on and off, to have a range of brightness, and to have two or more colors. Then, the show file may define lighting for the show, and the show controller operates each of the lighting elements to provide the lighting defined by the show file. The show system may also include a remote control device (e.g., a client device, a show prop, or the like) operable by a person in the room to transmit a show trigger signal to the show controller, and the show controller responds to receipt of the show trigger signal to initiate operation of the display device, the projector, and the audio system based on the show file.

DETAILED DESCRIPTION OF THE PREFERRED EMBODIMENTS

Briefly, a show system is described for providing a multimedia show presentation (or for providing multimedia in-room entertainment) in a space or room. The show system may be provided, in part, with a computer system (e.g., a show-controller type computer system) that is provided in a room, which may include nearly any space with one or more walls such as hotel room, a waiting room, a room at an event center, and so on. The room is augmented with environmental effects coordinated by the show system to enable programmed effects and show-style in-room entertainment, and the show system may be used to augment or even replace some prior in-room entertainment such as traditional television and room service activities.

The inventors recognized that most rooms such as hotel rooms are blank slates for the show system of the present description and can readily be enhanced by the multimedia show content provided by the new in-room show system. However, prior to the use of the in-room show system, this blank slate has remained unused or ignored including by the lodging industry that has typically limited in-room entertainment to room service, television-based entertainment, and Internet service.

A typical implementation of an in-room show system includes devices such as dimensional audio (e.g., an audio system providing surround sound to allow sounds to seem to come from different directions/sources in the room), programmable lighting (e.g., lamps with light emitting diodes (LEDs) or the like such as, but not limited to, a controllable lighting system such Philips Hue or similar lighting devices), a television, and a projector (e.g., one or more hidden microprojectors), and each of these system devices is coupled to the in-room show controller that coordinates their operations. Programming and content can be pushed to a room over a network connection and/or stored in memory accessible by the controller in advance to run on a preset schedule or in response to a selection (e.g., operation of a remote control or triggering device) by someone in the room (or a "guest"). The in-room show system combines a number of show technologies that may be used in stage shows, theaters, and the like and integrates these technologies in a unique manner to provide a multimedia show in a predefined or known space or "room" such as a hotel room.

The display device may take the form of a conventional television, such as a high definition (HD) liquid crystal display (LCD), an organic LED (OLED) display, or the like. However, the in-room show system provides a unique entertainment experience through the inclusion of a hidden projector(s) and a dimensional audio system that in combination with the display device can transform room surfaces by projection mapping backgrounds and dynamic content into the room. For example, in the morning in the hotel room application of the show system, guests in the morning can be awakened by a gently brightening outdoor or indoor setting while the "alarm" to awaken the guests includes sounds or music appropriate to the particular outdoor or indoor setting (which may be from a film). As the guest awaken, the show controller may run a different show using a second set of content that may include aquarium or sea-based projections on walls to encourage in the bathroom and parent-helping content such as animations to encourage kids to get cleaned up and dressed for the day (and may include reminders like brushing your teeth, hanging your towel, and so on).

Later in the day, when reservations are not possible or the family wants to stay in, the show system may be switched to match room service with an accompanying whole-room audiovisual theming to a guest-chosen or meal-matching scene/setting (e.g., provide illusion that the room is actually a dining room at a particular restaurant or some exotic outdoor setting). Gaming can be augmented such as with playing projection enhanced board games. When outdoor displays (such as resort light shows, fireworks, and so on) are being missed, the room can be used to provide an unobstructed in-room view of the light show, fireworks, or other show (e.g., as if the guests were actually at a prime spot outside for viewing this particular show), and the projected and displayed images as well as audio track output from the surround sound audio system provide an immersive multimedia show experience that can fill the entire room (or at least be provided using an entire wall as a display surface).

Figure 1:
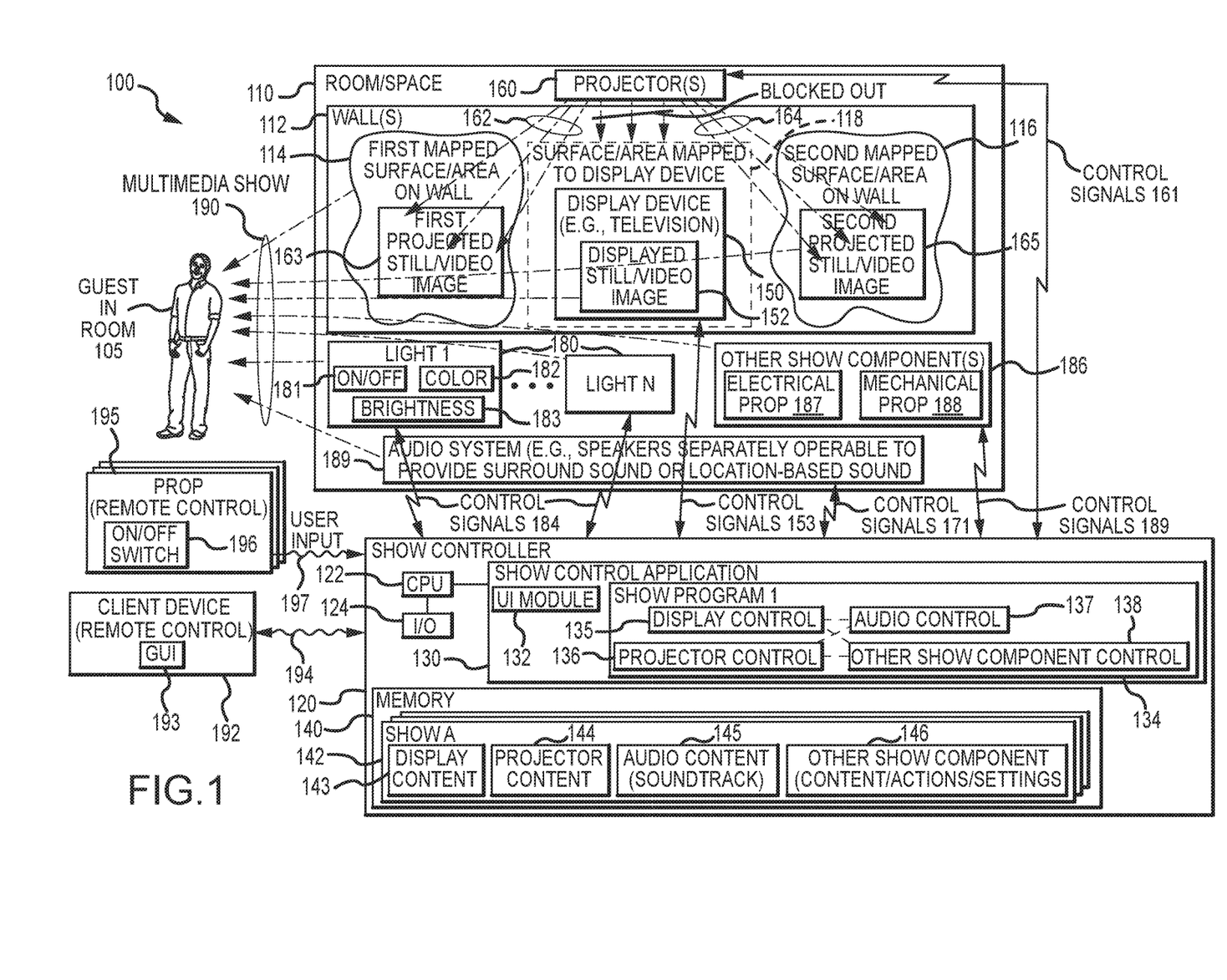
FIG. 1 is a functional block diagram of an in-room show system of the present description.

FIG. 1 is a functional block diagram of an operating in-room show system 100 of the present description that is operable to provide multimedia show or entertainment experience to a guest or person in a room/space 110 as shown with the combination of system outputs (represented by arrows 190). The room/space 110 may take a wide variety of forms to practice the system 100 but typically will include one or more walls 112 defining or enclosing an interior volume of the room 110. The wall 112 includes a first surface or area 114, a second surface or area 116, and a surface or area 118 associated with the location of a display device 150 on or near a portion of the wall 112, and each of these areas is predefined and used in designing a show to map where projected content should be provided to achieve a desired visual effect/show and where content should not be projected or be blocked as is the case for the area 118 (e.g., to avoid projecting light onto the display device 150 and interfering with its displayed image(s) 152). A person or "guest" 105 is in the room 100 and perceives the multimedia show 190.

The in-room show system 100 includes a show controller 120 that may take the form of a programmed computer system (or other electronic device) with a processor 122 managing operations of I/O devices 124, running code or software programs to provide a show control application 130, and managing memory/data storage 140 (which may be in the system 120 or be accessible over a network or communication link). The I/O devices 124 may include input and output devices such as a keyboard, a mouse, a touchscreen, a monitor, voice recognition software, and the like that allows an operator of the show controller 120 to provide user input and/or to initially configure the show controller 120 for automated operations such as by loading the software associated with the show control application 130 onto computer readable media of the show controller 120 and initiating operations of the controller 120 including running the show control application 130.

The show controller 140 includes memory 140 that is used to store files defining one to many shows 142 that may be provided to generate one or more multimedia shows 190 for a viewer/guest 105. Each show 142 includes content 143 for operating or playing on a display device 150, content 144 for projecting with the projector 160, audio content or a soundtrack for playing over an audio system 170, and other show component content, actions, and/or settings 146 for use by the controller 120 in operating other show components 186 (e.g., the programmable and/or independently operable lights 180, electrical props 187, mechanical props 188, a fan(s), a heating/cooling system in the room 110 to affect in-room temperatures to match a presented scene/setting, and the like).

The display device 150 may take the form of a conventional television (e.g., an LCD flat screen)) or another image display device(s) that is mounted on the wall 112 or positioned in the room 110 on or blocking a surface or area 118 on the wall 112. During operation of the system 100, the show controller 120 runs a show program 134 that includes a set of display controls 135, which are used to determine when and how to operate the display device 150 to provide the displayed still or video image 152 using the content 143. The control is achieved with control signals 153 transmitted in a wired or wireless manner from the I/O devices 124 of the show controller to the display device 150. For example, the display controls 135 may define timing of particular portions of the content 143 and/or define a start time for playing all of the display content 143.

The show system 100 further includes a projector 160 that is operated by the show controller 120 via wired/wireless control signals 161. The projector 160 may be a microprojector that is hidden from view by the viewer/guest 105, and the projector 160 may be video projector capable with a relatively high lumen output rating and/or be selected for its high definition output. In any case, the show program 134 includes a set of projector controls 136 that define timing of operation of the projector 160 with signals 161 to project all or predefined portions of the projector content 144. For example, the display device 150 may be operated initially (or at time zero in the show) to provide a displayed video image 152, and, at some predefined later time, the projector 160 may be operated to project 162 with content 144 a first projected still or video image 163 onto a first mapped surface or area 114 on the wall 112.

At the same or another later time, the projector 160 may be operated with signals 161 to project 164 with content 144 (that may be the same or differ from the content 144 used to provide first images 163) to create second projected still or video images 165 onto a second mapped surface or area 116 of the wall 112 (which will typically differ at least partially from the first area 114). In this way, the projector content 144 is mapped to particular surfaces/areas of the wall 112 (or video content is provided using projection mapping, which typically includes a mapping of the various content/images (still or video) to areas/surfaces of wall(s) 112) and different content can be provided on the various surfaces of the wall 112 to tell a story or create a desired show environment. To avoid interference with the display image 152 being provided on the display device 150, the area 118 on the wall 112 associated with the display device 150 may be blocked out or blacked out in the output of the projector 160 via projector content 144 and control signals 161 (e.g., light is not projected onto the display device 150 (unless desirable for some particular visual effect)).

The show system 100 also includes an audio system 170 in the room 110 that is configured, typically, with one or more speakers that can be independently and concurrently operated to provide surround sound or location-based sound effects perceivable by the viewer 105. The show file 142 includes audio content or a soundtrack 145, and the show program 134 includes a set of audio controls defining the timing of playing particular portions of the soundtrack 145 (or when to start the soundtrack for playback) with the audio system via control signals 171 from the show controller 120. The playback of the soundtrack or audio content 145 may be time synchronized with a particular displaying of an image 152 by display device, with a particular projection 162, 164 of an image 163, 165 by the projector 160, and/or operation of the lights 180 or other show components 186.

Further, the show system 100 includes a set of lights 180 that are controllable (e.g., independently controllable) based on the show program 134 and its other show component controls 138. For example, the lights 180 may each be a lighting device that can be controlled with control signals 184 to be turned on or off such as at a particular time in a show that is synchronized with another show event such as display of a particular image 163, 165 (which may be near the light 180 on area 114 or 116). One or more of the lights 180 may also be controllable with the signals 184 from controller 120 to have a particular color or color state/setting 182 (e.g., to change color over time during the timeline of the show, and, again, the changing of the color setting 182 may be time synchronized with another show event. Further, one or more of the lights 180 may have its brightness or brightness level/setting 183 set or controlled (or changed over time) based on control signals 184 from the show controller 120 based on program-based control 138 (which may be defined by other show component content/actions/settings 146 for the show file 142 for the current show). In this way, lighting of the room 110 can be provided by the programmatic control of the lights 180 to achieve lighting in a room space similar to that achieved in theatrical shows and/or to achieve unique effects (e.g., dim the lights for a romantic dinner in a room 110, gradually brighten and change the color of the lights 180 to provide a morning wake up "call"/show, light a lamp 180 when a projected image 163, 165 flies into or near the location of the lights (which may be mapped to the projection areas 114, 116), and so on).

The show system 100 may also include other show components 186 that are placed in or near the room 110 to enhance show 190. The other components 186 may include electrical props 187 (e.g., a display, an electronic sound effect device, and so on) and/or mechanical props 188 (e.g., a fan, a HVAC system/component, a robotic toy, and so on). Each of these components 186 may be separately and/or concurrently operable via control signals 189 from the show controller 120 based on a set of controls 138 that define when and how the components 186 are to be operated (e.g., as may be defined by the other show component content/actions/settings 146 in show file 142 for the current show being provided in the room 110).

As shown, the show control application 130 may run one or more show programs 134 and the memory 140 may store one-to-many show definitions or show-defining files 142. A default program 134 may be run that chooses the appropriate show files 142 to provide content. In other cases, though, the show program 134 (and associated file(s) 142) is chosen in response to user input 194 and/or 197 that is processed by a user interface (UI) module 132 of the show control application 130. Particularly, the show system 100 may include a client device 192 (e.g., a handheld computing device, a touchscreen input device, a remote control with touchscreen or buttons, and so on) that may be operated by a guest/viewer 105 in the room 110 to initiate one or more of the shows 142. For example, the UI module 132 may serve a graphical user interface (GUI) as shown at 194 to the client device 192, which acts to display the GUI 193 to the viewer 105 via a screen of the client device 193. The guest/viewer 105 may then select (e.g., with an input device of the client device 192) one show 142 from a listing of available shows in the room 110, and this may result in user input 194 being transmitted to the show controller 120 for processing by the UI module 132 to identify a show program 134 to run and, in turn, one or more of the show files 142 that are used by the program 134 in providing a multimedia show 190 to the guest 105.

In other cases, one or more props (or remote controls) 195 may be provided in the room 110, and each prop/remote control 195 may have an on/off switch (or activation element) 196 that can be operated to cause user input 197 to be provided to the show controller 120. The UI module 132 of the show control application 130 may process the input 197 to identify (e.g., via a prop ID in the message/user input 197) the prop 195 that has been activated or turned on, and, in response, to select a show program 134 to run (which, in turn, retrieves a show file 142 and its defined content 143-146) to provide a multimedia show 190. In this way, each prop/remote control 195 can be used to trigger its own show 190. For example, a person may bring in a meal (e.g., room service) and bring with them a prop 195 (e.g., a lantern, a centerpiece, and so on) that they "turn on" with switch/activation element 196 to signal 197 the show controller 120 to run a particular show program 134. The show program 134 may cause the show controller 120 to selectively operate the display device 150, the projector 160, the audio system 170, the lights 180, and the other show components 186 to provide the multimedia show 190 (e.g., to transform the room 100 into a famous restaurant or environment matched to or suited to the meal/room service).

Figure 2A:
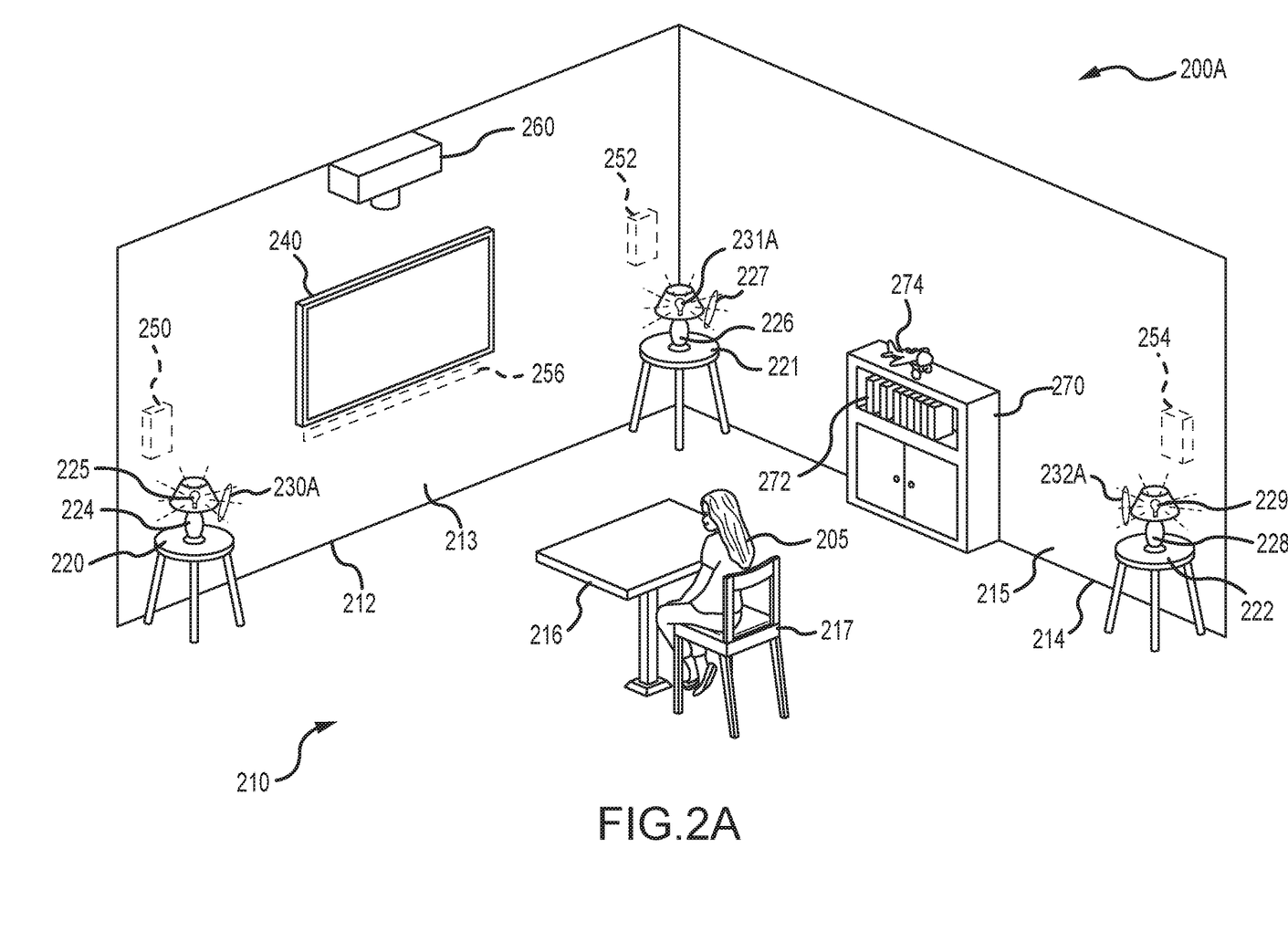
FIGS. 2A-2E illustrate an in-room show system of the present description, such as a particular implementation of the system shown in FIG. 1, installed in an exemplary room and operated in various operating states to transform the room into a show environment to allow people in the room to enjoy a multimedia presentation.

Beginning with FIG. 2A, a room 210 is illustrated in which an in-room show system of the present description, such as a particular implementation of the system 100 shown in FIG. 1, is installed and operated in various operating states to transform the room 210 into a show environment to allow people in the room to enjoy a multimedia presentation. FIG. 2A illustrates the in-room show system 200A in an initial or first operating state. The room 210 has an interior space defined, in part, by a number of walls with two side-by-side walls 212 and 214 shown for simplicity of illustration (with the understanding the room 210 also would have two or more walls, a ceiling, and other features and surfaces defining its interior space). A guest or viewer 205 is shown to be in the room 210 and, in this example, to be seated on a chair 217 at a table 216 toward the center of the room 210. Facing the guest 205 are the inner surfaces 213, 215 of the two sidewalls 212, 214. The room 210 may also include a number of furniture pieces such as tables 220, 221, and 222 and a bookshelf 270.

In this room 210, the in-room show system 200A is provided to transform the room 210 with multimedia content. To this end, the system 200A includes a lighting assembly or system that can be controlled by a show controller (e.g., not shown but may take the form of the controller 120 in FIG. 1 or the like), and, in this simple but not limiting example, the lighting assembly includes a set of lamps 224, 226, and 228 (but typically may also include more lighting fixtures including the overhead lighting elements and so on). Each of the lamps 224, 226, and 228 includes a bulb or element 225 227, and 229 that can be controlled by the show controller (e.g., via wired or wireless control signals) to be on or off, to have a particular brightness, and to have a particular color. In the initial or first operating state shown in FIG. 2A, the light bulbs/elements 225, 227, and 229 are being used in a conventional manner to illuminate the room 210 such as with a relatively high brightness level and to provide white light as shown with dashed lines 230A, 231A, and 232A.

The show system 200A also includes a display device 240 such as a flat screen television or the like mounted the inner surface/side 213 of the wall 212. The display device 240 is also controllable/operable by the show controller to display show content (called display content in system 100 of FIG. 1) and also to be on or off, with the display device 240 shown to be off (or not displaying content) in the first operating state shown in FIG. 2A. In other words, the first operating state may be considered to be pre-show or prior to any show being initiated and the show controller may place all of its components in non-show or pre-show states (or allow their operations to be controlled by other devices/inputs in some cases).

The show system 200A further includes a sound or audio system that in FIG. 2A is shown to include a number of speakers 250, 252, 254, and 256 recessed in the walls 212, 214 to hide their presence from the viewer 205 (although this is not required to practice the system 210A). The speakers 250, 252, 254, and 256 are arranged to provide surround sound and/or to provide directional or source-based sound in various locations of the room 210, with the speaker 256 being used to provide sound associated with content provided by the display device/television 240. In the first operating state shown in FIG. 2A for the system 210A, the show controller is operating the audio system to provide no output/sound (or the speakers are "off").

The show system 200A also includes a projector 260 that is also operable via wired or wireless signals from the show controller of the system 200A. The content to be projected (called "projector content" in FIG. 1) is mapped to the various surfaces/objects in the room 210, e.g., the surface/side 213 of wall 212 is mapped along with the location, size, and shape of the display device 240 such that content can be projected onto all the surfaces/areas 213 of wall 212 except the area associated with the display device/television 240 may be blocked or blacked out (e.g., no or little light from the projector 260 may be directed onto the screen of the device 240). In the first operating state shown of system 200A in FIG. 2A, the projector is "off" or in a standby mode and not projecting light/content (or no content is provided from the show controller).

The show system 200A also includes a number of props/remote controllers 272, 274 that can be operated by the guest/viewer 205 to initiate new shows or parts of shows (e.g., to interact with the show controller and/or the room 210). These props/remote controllers 272, 274 may take nearly any form with a prop/remote controller 272 shown in the form of a book and prop/remote controller 274 shown as a toy (e.g., an airplane). These props 272, 274 are "off" in the first operating state of system 200A shown in FIG. 2A such that the shows or show content associated with or triggered by each is not being presented by the show controller via operation of the show system 200A. When activated or turned on by the guest 205 (e.g., simply by opening or picking up the book 272, moving or operating an "on" switch on the plane/toy 274, and so on), the two props 272, 274 may cause the show controller to initiate two different shows/sets of content (e.g., receive signals that identify which prop is "on" or activated, retrieve a file defining a show (such as file 142 in FIG. 1), and operate the components of the show system 200A to provide a multimedia show presentation such as a show associated with the book's content (e.g., read the book aloud over the audio system while providing video or still images with display device 240 and projector 260 with scenery/characters from the book), a show suited to the toy (e.g., provide images similar to those seen by a pilot of an airplane on the wall surface 213 and display device 240), and so on.

Figure 2B:
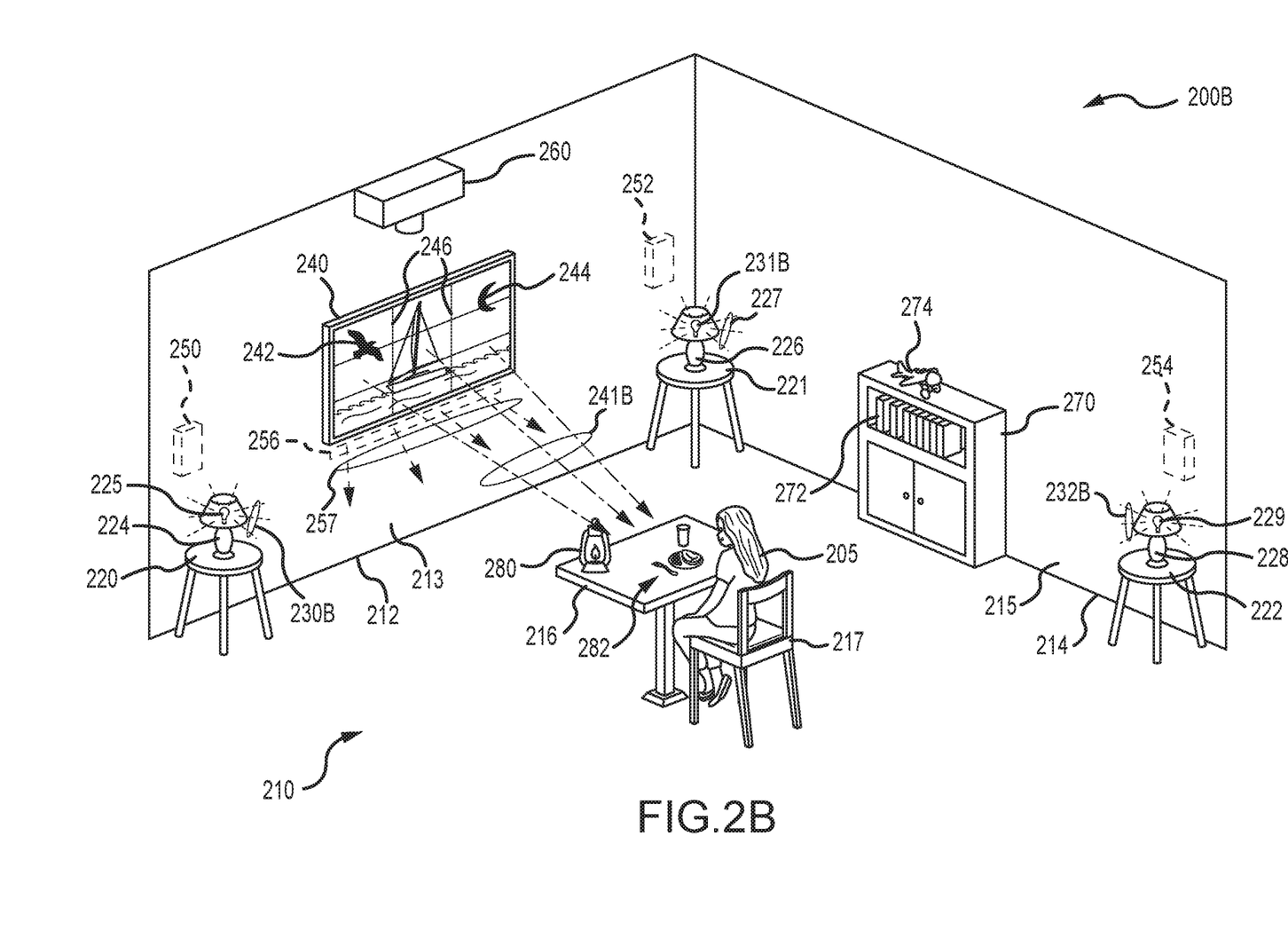

FIG. 2B illustrates the room 210 when the show system 200B is operating in a second operating state or mode. In this example, the guest/viewer 205 is eating a meal 282 such as may be provided by room service in a resort/hotel or on a cruise ship. The person bringing the room service/meal 282 may also bring with them a prop/remote controller 280 such as a lantern as shown, and they (or the guest 205) may turn on or activate the remote controller/prop 280, which causes a signal to be transmitted to the show controller of the system 210B. The show controller responds by determining the ID of the controller/prop 280 and retrieving a show file associated with this prop/remote controller 280 from memory/data storage. This show file defines the show's content and how and when each component in the show system 200B is to be operated/controlled. In this example, the show file defines a "show" for transforming the room 210 into a restaurant associated with the food/room service setting 282 (e.g., a restaurant which may have a unique atmosphere and visual and/or audio characteristics and which may be difficult to obtain reservations to).

Particularly, as shown in FIG. 2B, the show controller acts to operate the lighting system in a second operating mode/state, and this may involve dimming the brightness and/or modifying color of each lighting element/bulb 225, 227, 229 (or even turning all or some of these bulbs 225, 227, 229 off) as shown with second output light 230B, 231B, and 232B. Concurrently or sequentially, the display device (e.g., television) 240 is operated by the show controller to display content to the guest/viewer 205 as shown with light 241B transmitted outward from its screen. In this example, the second operating mode or state involves the display device 240 presenting content 241B that begins to place the guest/viewer 205 in the restaurant (e.g., provide the view and sounds that the guest/viewer 205 would experience if actually at the restaurant).

In this example, the restaurant is a seaside restaurant, and the content 241B is chosen to transform the screen of the display device 240 into a window of the restaurant by including a window frame 246, and outdoors objects such as the sea with its waves, a ship sailing on the sea, a flying sea bird 242, and the moon 244. Also, the show controller operates the sound system to play or output as shown with arrows 257 a soundtrack or set of sounds from the speaker(s) 256 near or associated with the display device 240. In this way, the sounds appear to be coming from the window (which may be open), and these sounds may include sea/ocean noises, bird (or other wildlife sounds), wind/breeze sound effects, and/or may include sounds similar to those of the interior of the restaurant (such as music, the background chatter and noises from "other diners", and the like). In this second operating mode or state of system 200B, the show controller coordinates or synchronizes operation of the audio system, the lighting system, and the display device to create multimedia presentation or effect.

Figure 2C:
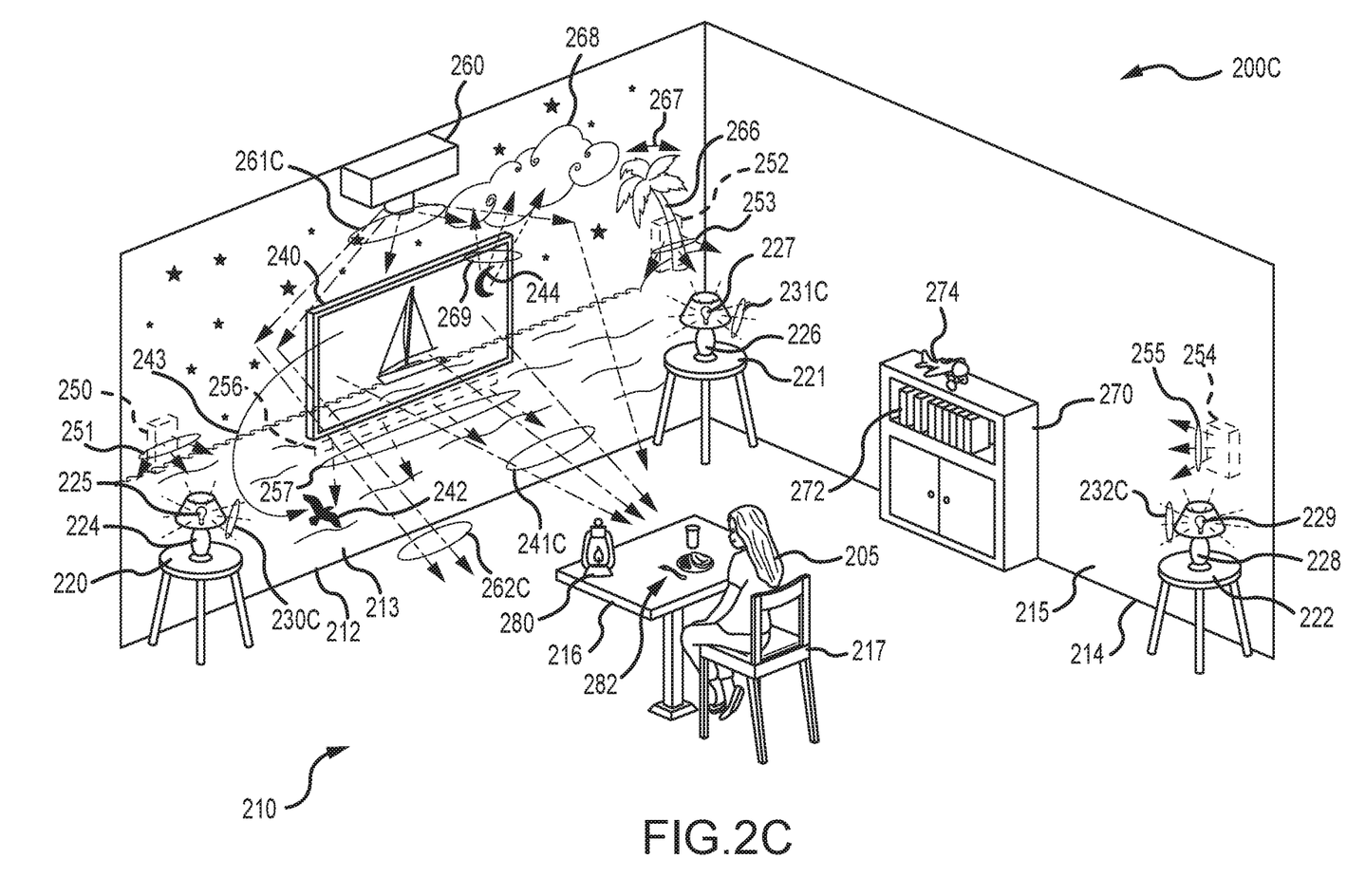

The show triggered by the prop/remote controller 280 includes additional content that causes the room 210 to transform further such that the window provided by the display device 240 in the second operating state of FIG. 2B disappears as does the wall 213. In other words, the room is "moved" onto the patio or deck of the seaside restaurant being simulated by operation of the show system. Particularly, FIG. 2C shows the room 210 with the show system 200C operating in a third state or mode (or at a different point in the timeline defined by the show file retrieved in response to the trigger signal from prop 280 and being "played back" by the show controller of system 200C).

As shown, the display device 240 is now displaying differing content as shown with light 241C transmitted from the device's screen toward the guest/viewer or into room 210. This content does not include the window bars/frame elements 246 shown in FIG. 2B as the display device's content 241C is being blended with the content on wall surface 213. To this end, the controller acts to operate the projector 260 to project content/light 261C onto the wall surface 213 (except typically in areas associated with the monitor/display device 240). All the areas or surfaces 213 of wall 212 are mapped for projection by projector 260 (e.g., the content provided by the projector as shown at 261C is mapped to the wall surface(s) 213). For example, a palm tree 266 is shown to be projected onto the wall surface 213 to one side of the display device 240 and be growing from a sandy beach displayed below the display device 240. The wall 212, in effect, provides a projection surface or screen for the projector 260 as light 262C from its surface 213 is reflected/directed with the light 241C from the display device 240 to the guest/viewer 205 (or into room 210).

Further, the projected content/light 261C is chosen to match or extend the content 241C from the display device 240. In this example, the display device 240 may be hidden or appear to be the source of the imagery on the wall surface 213 by having the content 261C matched in location and composition with the content 241C from the display device 240. For example, the sea/waves shown with the display device 240 are extended out in the projected content 261C in locations mapped to the location of the display device 240 and even its content. Similarly, the moon shown in the display device 240 is used to "light" nearby objects in the projected content 261C, e.g., a cloud 268 in the projected sky above the display device 240 on an area of the wall surface 213 as shown with arrows 269. Similarly, the sea bird 242 is shown by arrow 243 to appear to fly out of the display device 240 onto areas of the wall surface 213.

The multimedia show provided in the third operating state (or at a third time on the show's timeline) also involves the show controller modifying operations of the programmable/controllable lights 225, 227, 229 to further the illusion that the room is part of an outdoor deck/patio of the seaside restaurant in the evening (or other time of day). This may again involve modifying the brightness and/or color of the output light as shown with arrows 230C, 231C, 232C. In some cases, the lamps 224, 226, 228 are designed to further some show effect such as to appear to be oil lamps, torches, candles, and so on that are "lit" by the show controller turning on each bulb/lighting element 225, 227, 229 and controlling their brightness and/or color to suit the particular effect.

The show controller in the operating state of system 200C in FIG. 2C also modifies operations of the audio/sound system such as by playing audio content (a soundtrack) from each of the additional surround sound speakers 250, 252, 254 with this directional/location-based output sound shown with arrows 251, 253, 255 and being perceived in the room 210 by the guest 205. For example, the bird 242 in the projected content may move 243 (the projected content 261 includes video or animation) from a portion of the wall surface 213 near the speaker 251 to a portion of the wall surface 213 near the speaker 253, and sounds associated with the bird 242 can be played first from the speaker 251 and then from the speaker 253 to enhance show experience by providing source-based or location-based surround sound. Similarly, sound effects or audio output 253 associated with the movements 267 of the palm tree 266 may be provided from the speaker 252 as this is the nearest or most proximate speaker in the audio/sound system in the show system 200C. The experience can be terminated by removal of the prop/remote controller 280 and/or by operating a switch turning the prop/remote controller "off" (or signaling the show controller with prop 280 to turn the present show off or to end this show).

By selective and well synchronized control of the various components of a show system and use of the room as a blank slate to show differing content, the range of shows that can be presented in the room are nearly limitless or only limited by the imagination of the users of such a show system. Hence, the example provided in FIGS. 2B and 2C is only one useful (but simplified) example (which of course can continue along the show timeline with the show system being operated in many differing states as differing content is displayed and output with the show system).

Figure 2D:
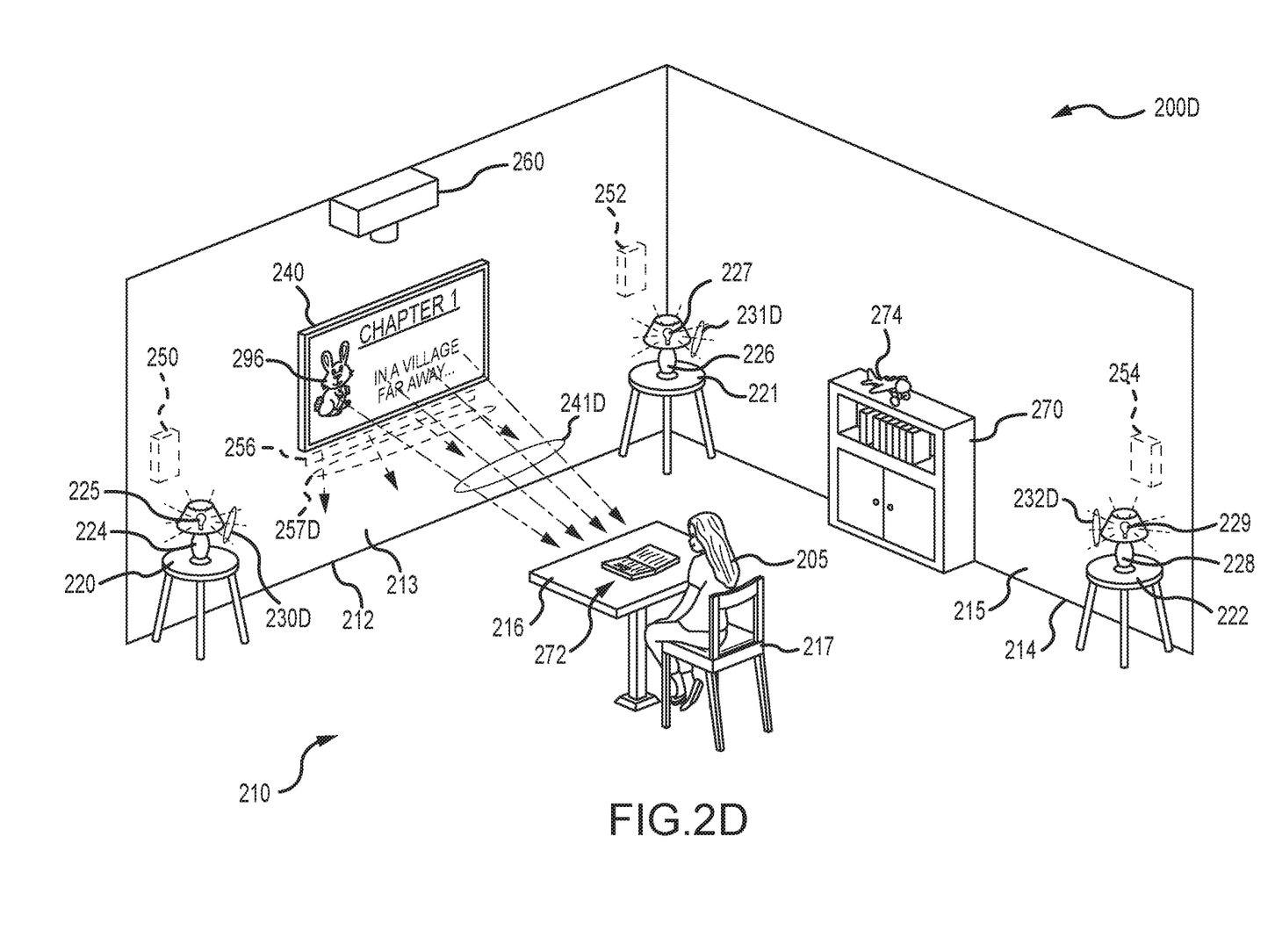

With these varying "shows" or show experiences in mind, it may be useful to describe another show that can be provided by a show system in room 210. FIG. 2D illustrates the room 210 when instead of the room service-based prop/controller 280 the guest 205 has retrieved a book 272 from the bookshelf 270 and opened it. Either picking it up or opening it (or flipping a switch on the book) may be used to cause a show activation signal to the show controller, which responds by identifying the book sending the signal, retrieving a show file defining a show or a set of show content associated with the book 272, and operating the show system to provide a show experience in the room 210 suited to the book 272.

For example, FIG. 2D shows that the show controller is operating the display device 240 to display content 241D on its screen associated with the book 272. The show experience may be a unique storytelling or immersive reading experience, and the content 241D may include displaying pages of the book 272. The soundtrack/audio content file may be provided, in part, from speaker 256 near the display device 240 and include a narrator's voice as they read the displayed pages or tell the story. In addition to the use of the audio system and the display device 240, the show system 200D in this operating state may act to control operations of the lighting elements 225, 227, 229 to output light 230D, 231D, 232D of a desired brightness and color.

Figure 2E:
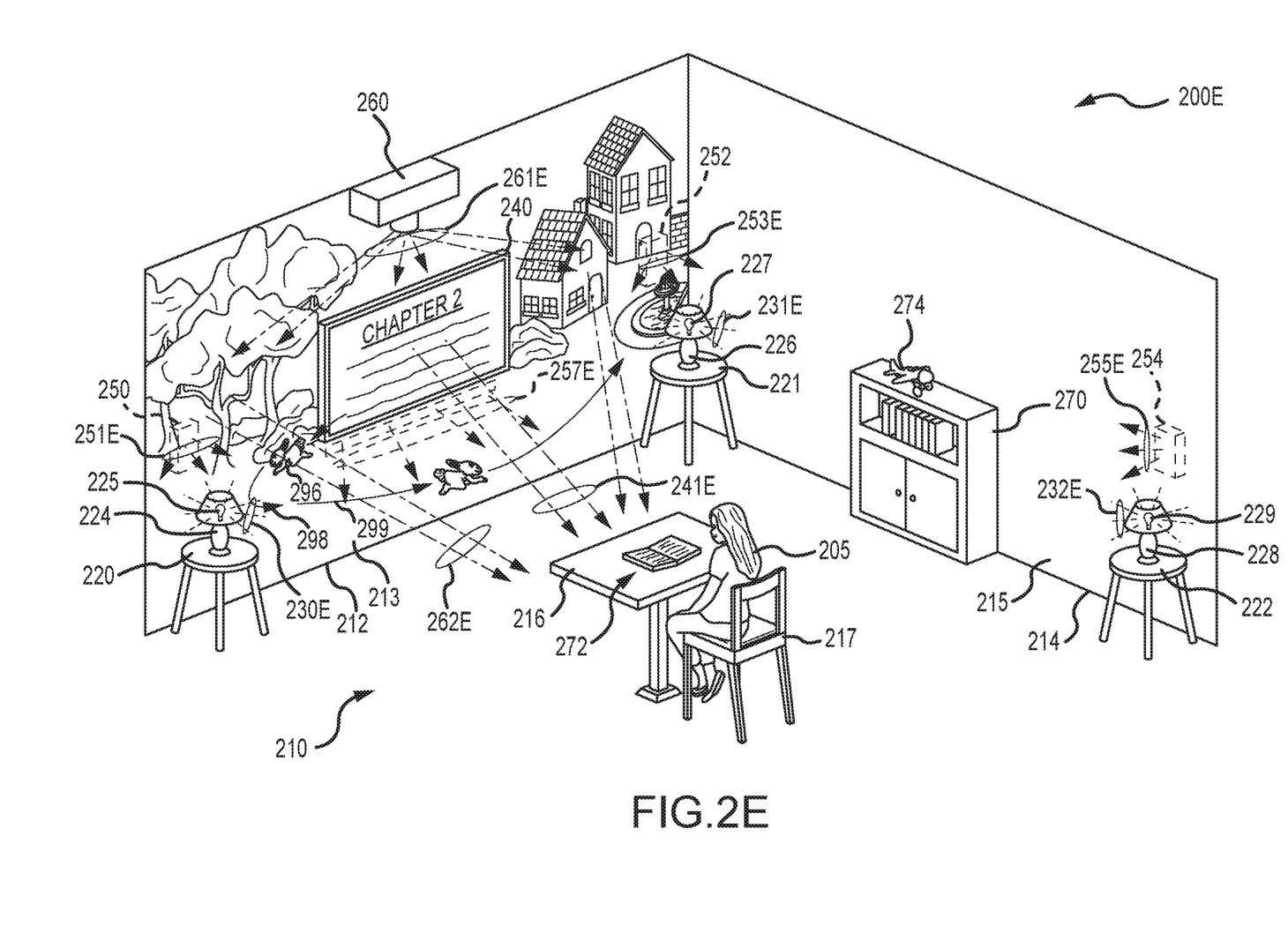

FIG. 2E illustrates the room 210 later in this book-based (or prop-based) show when the show controller operates the show system 200E in a different or second operating state (or based on a different set of show content). As shown, the display device 240 is operating to display different content 241E such as a later page/chapter of the book 272, and, concurrently, the speaker 256 near the display device 240 is used to output different audio output 257E, e.g., the narrator reading the currently displayed book pages or the like.

Also, in a time synchronized manner, the show controller operates the projector 260 to project light 261E based on content associated with the book 272, and this projected content is perceived by the guest 205 with the displayed content 241E as shown with arrows 262E. The projected content 261E is mapped in location to the surface 213 of the wall 212 (and location of the display device 240 and other parts of the show system 200E including the lamps 224, 226, 228). In this manner, the projected content 262E can be used to transform the room 210 to match the subject/content of the book 272. For example, the village or other setting described in the book 272 and displayed content 241E can be provided in still and video images in the projected content 261E. Further, a character 296 of the book 272 previously only shown as part of the displayed content (see FIG. 2D) can leap off the "page" and move about the wall surface 213.

The lighting assembly can also be controlled based on the projected content 261E such as to cause a bulb/lighting element 225 or 227 to modify its operations (e.g., become brighter or dimmer or change color or turn on or off) when the character 296 (or other aspect of the projected content 261E) runs by or into the lamp 224 or 226. While the projector 260 may not project on wall surface 215 of adjacent wall 214, show effects with show system components spaced apart from the surface 213 can be provided in a manner that is time synchronized with the projected and/or displayed content to further provide unique show features. For example, the story being told may involve changing weather such as lightening, and the bulb/lighting element 229 may be flashed on and off to simulate lightening (provide light output 232E) in the room 210 and/or the speaker 254 may be used by the show controller to output sound effects or a part of the audio track or soundtrack as shown at 255E used to simulate thunder. As another show effect, the projected character 296 could run off the surface 213 and "disappear" (or not be projected or displayed anymore), but, after an appropriate delay, the speaker may play a crash or other noise from the remote/distal speaker 254 as shown at 255E and change operation of the light 229 to provide output light 232E (the noise could cause the light to go off or on, to change color, to change brightness, and so on). Further, the show controller can modify the operations of the audio system to enhance the show such as by playing portions of the soundtrack or audio file on the surround speakers 250, 252, 254 as shown at 251E, 253E, 255E to suit the ongoing storyline as well as displayed and projected content 241E and 261E.

Figure 3:
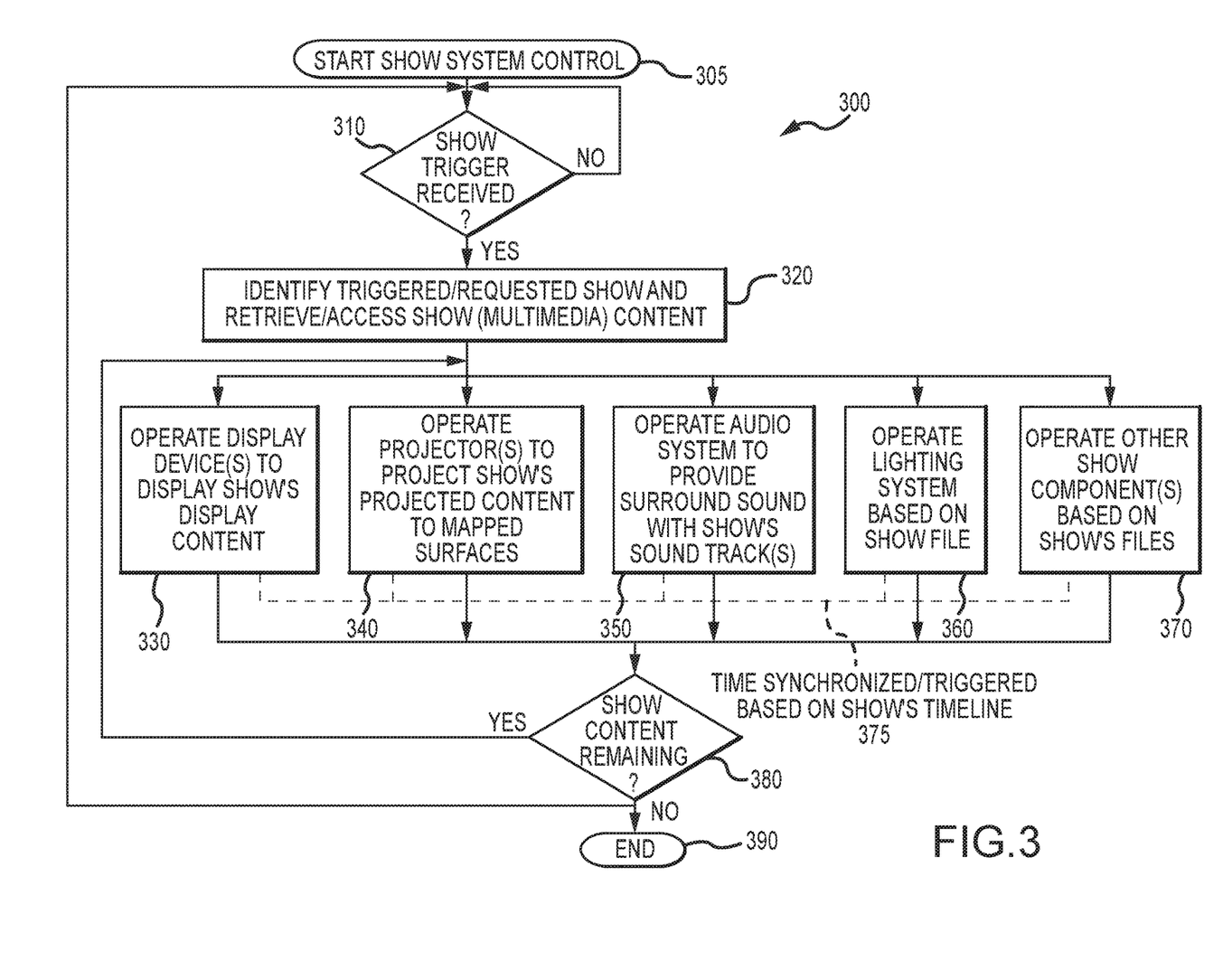
FIG. 3 is a flow diagram of a method for operating and/or controlling a show system of the present description such as via operations of the show controller of the system of FIG. 1.

FIG. 3 is a flow diagram of a method 300 for operating and/or controlling a show system of the present description such as via operations of the show controller 120 of the system 100 of FIG. 1. The method 300 begins at 305 such as with preparing an in-room show system for use in a particular room (e.g., any space with walls or other surfaces defining a space for providing a show experience as described herein). This may involve selecting a display device(s) and positioning the display device within the room such as by a hanging flat screen or similar television on an interior surface of a wall defining the room, by positioning a display monitor on a stand in the room and so on.

The startup 305 may also include choosing a projector for projecting video onto one or more walls or other surfaces of the room that act as projection screens during operation of the show system. A location for the projector is chosen relative to the wall or other projection surface, and the wall's surface or other projection surface is mapped (e.g., projection mapping is used to provide video or still images on one or more of the room's surfaces with this projector) from this particular projector location and orientation (where its projection lens(es) are facing and at what projection angle). The startup step 305 may further include providing programmable lights (or a lighting system with one to many selectively controllable bulbs or lighting elements) at various locations in the room to achieve desired lighting effects to suit one or more shows planned for the room. With this in mind, the startup 305 typically also includes choosing and designing one or more shows for the room, and these shows may dictate the lighting system design, the display device, and the location and number of the projectors.

Further, a show controller (e.g., a computing device) is provided in or near the room that is adapted to run a show control computer program and to communicate in a wired or wireless manner with the various show components to provide control signals and cause the components to play back show content and/or to function in a manner defined by the show file. For example, a particular lighting element may be turned on at a predefined time in a show timeline that coincides with the projector projecting particular content/light onto a surface near that lighting element and so on. The show system startup 305 also may include providing an audio system in (or near) the room's interior space, and the audio system is controlled via signals from the show controller typically to provide surround sound effects during a show such as by playing differing portions of a soundtrack from speakers positioned in a number of locations about a room (e.g., on all sides of the center of the room so that a person in the room perceives sounds in the show as having two or more sources at differing locations in the room).

The show system may include additional show components (such as a fan, an electrical-based show prop, a mechanical-based prop, and so on), and each of these are positioned in the room and configured for communications with the show controller in step 305 (e.g., to receive control signals triggering these components to operate at particular times in the show's timeline). In step 305, one or more props or other remote control devices (or a client device providing a user with a show control GUI or the like) may be chosen for use in the room. Each of these will be configured to initiate one or more of the shows created for the particular room.

Step 305 may also include the show controller operating to place some or all of these show components into a standby or "off" operating state or mode. For example, the projector and display device may be turned "off" or at least not be projecting or displaying any content, the audio system may be off or not outputting any sound, and the lighting system may be "off" or placed in a non-show mode where other controllers besides the show controller may determine their operations (likewise, the display device may take the form of a conventional television, and it may be placed in a pre-show or standby mode/state of operation allowing a conventional remote control device to affect its operations until control is assumed by the show controller).

The method 300 continues at 310 with the show controller being in a standby operating mode and determining whether a show triggering signal (or remote controller input signal) has been received. If not, the method 300 continues at 310. If a signal has been received, the method 300 continues at 320 with the show controller identifying the device that transmitted the signal and/or determining from the communication/message the ID of the show being triggered. Then, the show controller in step 320 acts to retrieve and/or access the show file identified by the trigger signal, and the show file defines the content for the show and/or how to control each of the show components over the show's timeline (or runtime).

The method 300 continues with the show controller acting to operate each of the show components (or a subset defined by the show file) in the show system in a time synchronized manner (as shown with dashed line 375 in FIG. 3) to provide a multimedia show experience in the room. The operations of the show components are time synchronized along the show's timeline, and this may involve concurrent operations and/or sequential operations over time (see, for example, the shows described above in reference to FIGS. 2A-2E). Hence, FIG. 3 illustrates that the method 300 involves the show controller (directly or via intermediate control devices) generating and transmitting control signals for: (a) operating the display device (e.g., a television or the like) to display the show's display content defined for the length of the show's timeline; (b) operating the projector to project the show's projected content defined by the show file for the length of the show's timeline; (c) operating the audio system to play the soundtrack(s) defined by the show file for the length of the show's timeline; (d) operating the light system to illuminate or light the room's space and surfaces based on lighting effects defined for triggering along the show's timeline; and (e) operating the other show components to perform actions/functions defined by the show file at particular points in time along the show's timeline.

The method 300 continues at 380 with the show controller determining whether the show file defines further show content (or whether the end of the show or end of the show's timeline has been reached). If more show content remains, steps 330, 340, 350, 360, and 370 are continued with synchronized control of the various show system components to continue the presently triggered/selected show in the room. If the show is ended, the method 300 may end at 390 (e.g., shut down the show system) or at 310 with placing the show system in standby mode and awaiting a next show-triggering signal.

Figure 4:
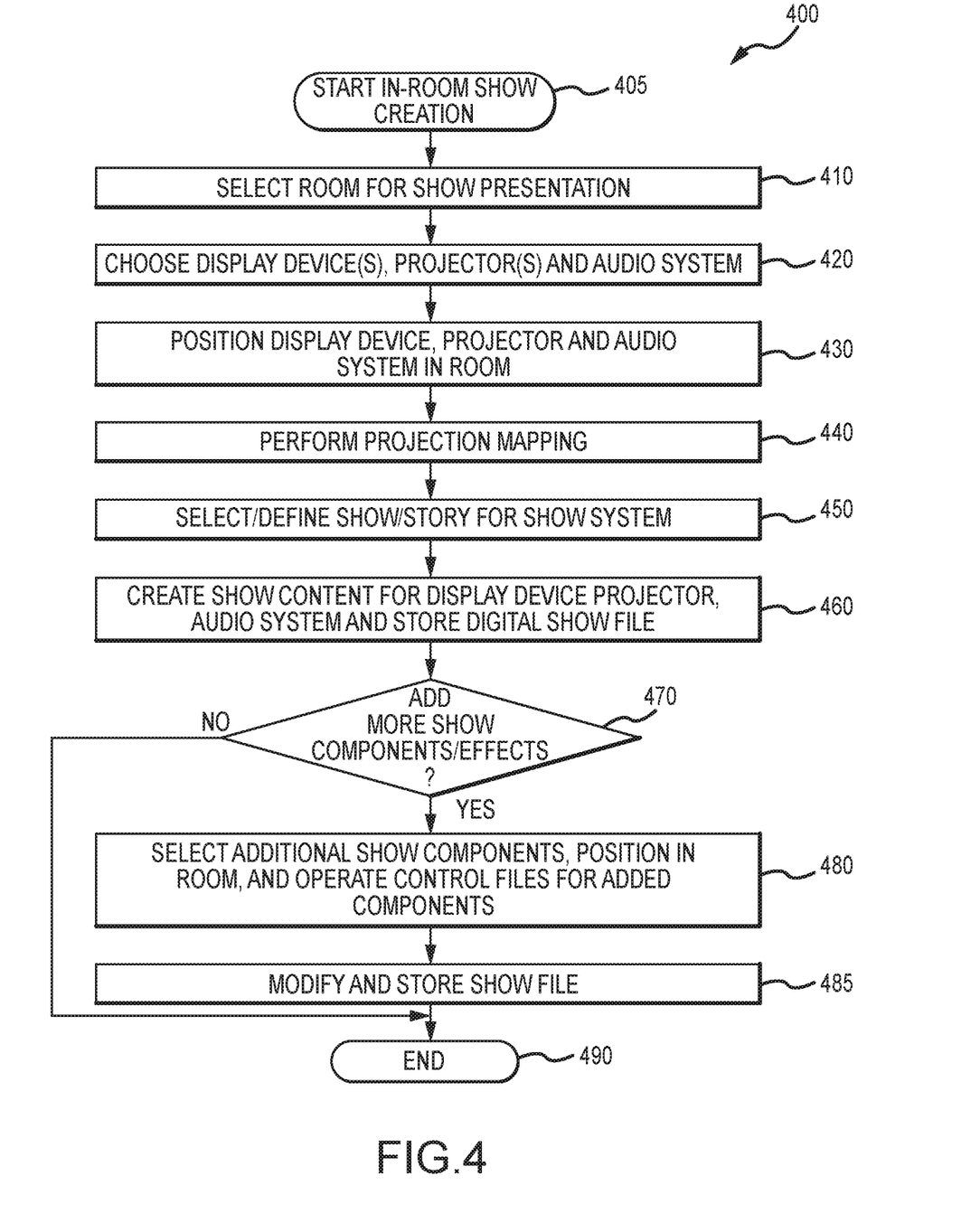
FIG. 4 is a flow diagram of a method of generating a show file defining content and controls for an in-room show system of the present description.

FIG. 4 illustrates a show file generation method 400 for use in creating content and control instructions for a show to be presented in a room by operation of an in-room show system of the present description. The method 400 starts at 405 such as with identifying potential components for inclusion in a show system to provide content and/or special effects. Step 405 may also include generating/writing a show control application and loading this software on a show controller.

The method 400 continues at 410 with selecting a room (e.g., nearly any space where it is desirable to provide a multimedia show such as a resort or hotel room, a game room, an event room/space, and the like) that is to be transformed into an entertainment space with an in-room show system. Then, the method 400 continues with selecting show system components such as a display device (e.g., a television), a projector (e.g., a video projector such as a microprojector), and an audio system (e.g., one or more speakers and audio playback equipment). Note, step 460 may be performed prior to step 420 as the particular show that is going to be presented may drive the show components to be included in the show system. The method 400 continues at 430 with choosing locations for these show components and then mounting or otherwise positioning the display device, the projector, and audio system (speakers) in their assigned/chosen locations in the room (or nearby to the room's interior space such as in/on the ceiling or walls).

The method 400 continues at 440 with performing projection mapping for the positioned projector to provide a 3D mapping of the surfaces in the room upon which the projector will project its content (e.g., a wall defining the interior space of the room and upon which the display device may be mounted). The method continues at 450 with selecting or defining the show or story to be provided by the show system. Then, at 460, show content and component controls are created for the display device, the projector, and the audio system. Note, the projection mapping may include the display device or other features in the room that it may not be desirable to project content upon, and the projector content may include areas/surfaces that are mapped but that are blacked out/blocked out so that no (or little) light (content) is projected upon these surfaces. Also, the operation of the various show system components is synchronized, and this may be achieved by a show file having a single timeline for providing content/operation show components and control signals are defined relative to this timeline (e.g., to allow a character/object displayed at a first time on the display device to be projected by the projector at a second time (and no longer on the display device) so as to appear to move off the display device onto a projection surface in the room (e.g., a wall surface)). The show file is then stored in memory/data storage.

The method 400 then continues at 470 with a determination of whether additional show components are to be included in the show system to generate more content and/or provide additional effects. For example, the show may be enhanced by providing lighting or light-based effects, and the show system may include a lighting system with one-to-many programmable light bulbs or lighting elements. If not, the method 400 ends at 490.

If more components to be added, the method 400 continues at 480 with selecting additional show components (e.g., lighting elements, show props that can be activated to come alive or provide some show-based effect in the room, a fan to selectively provide "wind", a HVAC controller for changing operation of the room's HVAC system to change the temperature in the room, and so on) to achieve the desired effects and/or provide the additional show content. Step 480 also includes positioning these components in the room and modifying the show file to include control instruction sets for each of these new components tied or linked to the show timeline to synchronize their operations by the show controller with the other show system components. The show file is modified to include these control instruction sets, and the show file is stored in memory/data storage for later retrieval (or access) by the show controller to present a show in the room via operation of the show system using the show file. The method 400 may end at 490 (or continue at 410 with generating another show file for the room and its in-room show system).

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. A system for providing entertainment with multimedia content matched to a particular space or room, comprising:
   a display device positioned in a room;
   a projector positioned in the room for projecting on one or more surfaces in the room;
   an audio system for providing audio output into the room; and
   a show controller operating, based on a show file defining display content, projector content, and audio content for a show, the display device to display the display content, the projector to project the projector content onto the one or more surfaces in the room, and the audio system to output the audio content for the show into the room,
   wherein the projector content is mapped, prior to the show controller operating, to the one or more surfaces in the room using projection mapping,
   wherein the projection mapping includes determining size, shape, and location of the one or more surfaces in the room and at least one of fitting and aligning the projector content to the size, shape, and location of the one or more surfaces in the room,
   wherein during a first time period the display content includes an object, and
   wherein during a second time period the projector content includes the object and the display content is free of the object, whereby the object moves from the display device onto the one or more surfaces between the first and second time periods.

2. The system of claim 1, wherein the display content, the projector content, and the audio content are time synchronized to each other based on a timeline for the show.

3. The system of claim 1, wherein the display device comprises a television mounted on a wall of the room, and wherein the projector content comprises video content matching the display content displayed on the television, and wherein the display device and the projector are concurrently operated for at least a portion of the show.

4. The system of claim 3, wherein the projection mapping includes the television and the video content includes a blacked out area coinciding with an area of the wall where the television is mounted, whereby light output from the projector is projected on surfaces of the wall excluding the television.

5. The system of claim 4, wherein the audio system includes speakers spaced around the room to provide surround sound, wherein the audio content includes a soundtrack matching both the display content and the projector content, and wherein the soundtrack includes first content associated with the display content and second content differing from the first content associated with the projector content.

6. The system of claim 1, further comprising a remote control device operable by a person in the room to transmit a show trigger signal to the show controller, wherein the show controller responds to receipt of the show trigger signal to initiate operation of the display device, the projector, and the audio system based on the show file.

7. The system of claim 1, wherein the show controller operates at least one of the audio system and a lighting element based on a location of the object on the one or more surfaces during the second time period.

8. The system of claim 1, wherein the one or more surfaces include surfaces of at least one 3D object.

9. The system of claim 1, wherein the projection mapping includes mapping corners of the projector content to the one or more surfaces after spatially mapping the one or more surfaces.

10. A system for providing entertainment with multimedia content matched to a particular space or room, comprising:
 a display device positioned in a room;
 a projector positioned in the room for projecting on one or more surfaces in the room;
 an audio system for providing audio output into the room;
 a show controller operating, based on a show file defining display content, projector content, and audio content for a show, the display device to display the display content, the projector to project the projector content onto the one or more surfaces in the room, and the audio system to output the audio content for the show into the room, wherein the projector content is mapped to the one or more surfaces in the room using projection mapping that includes spatially mapping the one or more surfaces prior to operating the projector and modifying at least one of size and location of the projector content to fit or align the projector content to the spatially mapped one or more surfaces; and
 a lighting system with lighting elements, separate from the projector and display device, that are independently operable to turn on and off, to have a range of brightness, and to have two or more colors, wherein the show file defines lighting for the show, and wherein the show controller operates each of the lighting elements to provide the lighting defined by the show file by turning one or more of the lighting elements on or off, by adjusting a brightness of one or more of the lighting elements, or by selecting a color of one or more of the lighting elements.

* * * * *